United States Patent [19]

Marable et al.

[11] Patent Number: 5,177,759
[45] Date of Patent: Jan. 5, 1993

[54] METHOD AND APPARATUS OF FABRICATING A REFLECTOR

[75] Inventors: Scott R. Marable, Oviedo; Richard D. O'Neal, Winter Springs, both of Fla.

[73] Assignee: Laser Photonics, Inc., Orlando, Fla.

[21] Appl. No.: 530,600

[22] Filed: May 30, 1990

[51] Int. Cl.[5] .............................................. H01S 3/03
[52] U.S. Cl. ....................................... 372/61; 372/62; 372/65
[58] Field of Search ..................... 372/72, 95, 61, 65, 372/62; 376/92, 98

[56] References Cited

U.S. PATENT DOCUMENTS

| | | | |
|---|---|---|---|
| 3,634,777 | 8/1970 | Uchida | 372/72 |
| 4,232,276 | 11/1980 | Iwata | 372/72 |
| 4,566,107 | 1/1986 | Kitaura et al. | 372/72 |
| 4,601,038 | 7/1986 | Guch, Jr. | 372/72 |
| 4,858,243 | 8/1989 | Bar-Joseph | 372/72 |

Primary Examiner—Léon Scott, Jr.
Attorney, Agent, or Firm—Allen, Dyer, Doppelt, Franjola & Milbrath

[57] ABSTRACT

An apparatus and method of fabricating an tubular reflector for use in a laser. The tubular reflector is formed by first grinding smooth the inside surface of a round metal tube. The polished tube is inserted into an elliptical mold. The mold is then pressed to shape the round tube into an elliptical tube. Next the inner wall of the tube is coated with a highly reflective material. Finally, a light source and a laser rod are positioned in the tube such that after the light source is turned on, light is reflected off the reflective walls of the tube to the laser rod resulting in laser light emitting from the ends of the rod. It may also be preferable that the elliptical tube be formed by combining and bending two flat metal sheets.

13 Claims, 2 Drawing Sheets

METHOD AND APPARATUS OF FABRICATING A REFLECTOR

BACKGROUND OF THE INVENTION

This invention relates laser apparatus and method of fabricating an elliptical tube reflector for use with a laser.

As is known, a laser includes a high intensity light source adjacent a crystalline laser rod, such as neodymium YAG or ruby material. The light source and the laser rod are typically disposed in parallel to each other, and are enclosed by known techniques in a cavity or tube having reflective inner walls. The tube is typically cylindrically shaped, having either a round or elliptical wall configuration.

During operation, the light source is energized resulting in light being either directed into the laser rod or reflected off the tube's inner wall and then into the laser rod. The high intensity light stimulates a coherent light beam that is emitted out of the laser rod. The light emitted from one (or both) of the ends of the laser rod may be reflected back into the laser rod.

There are many known methods known for constructing the tube enclosing the light source and the laser rod; one such method is by first identically machining two metal blocks each into the shape of a semicircle or semi-ellipse. The machined surfaces are then smoothed and provided with a highly reflective coating. Next, the blocks are bound together such that the machined surfaces of the blocks face each other to enclose a cavity having round or elliptically-shaped walls. A problem with this technique is that grinding of the blocks' surfaces into the proper shape may be time-consuming and expensive. Further, when the two blocks are bonded together, a good seal between the blocks may not always be formed.

SUMMARY OF THE INVENTION

It is an object of this invention to provide an improved tubular reflector.

It is also an object of this invention to provide an improved method for fabricating an elliptically-shaped tubular reflector.

Another object of this invention is to fabricate a tubular reflector for use in a laser that is imparted with an inner surface which improves the laser's output efficiency.

A further object of this invention is to manufacture an elliptically-shaped tubular reflector more efficiently.

Also, the object of this invention is to impart an irregular surface onto the interior wall of a laser to improve the laser's output efficiency.

It is additionally an object of this invention to form an elliptically-shaped tubular reflection from a unitary tube.

These and other objects are provided with a method of fabricating a tubular reflector for use in the laser, the method comprising the steps of providing a tube having an inner wall, pressing the tube with a mold to change the shape of the tube, and placing a light source and a laser rod into said tube, such that when said light source is energized, a portion of the light generated therefrom is reflected off the inner walls of the tube and into the laser rod. Thus, by pressing the tube, the shape of the tube may easily be changed. It is preferable that the method further comprise the step of crinkling the inner walls of the tube when the tube is pressed to improve the laser's output efficiency.

Alternately, a laser is provided comprising a tubular reflector formed by pressing a tube into a substantially elliptical tube with a mold. The pressed tube having a cavity and an inner wall with a reflective surface, and means disposed within the cavity for sourcing high intensity light, such that a portion of the light is reflected from the reflector's surface, and means disposed within the cavity, and in optical communications with the generating means, for transforming the high intensity light and the reflective light into a coherent light beam. By pressing the tube an elliptically-shaped tube may be easily constructed from a round tube.

DETAILED DESCRIPTION OF THE PREFERRED EMBODIMENTS

A detailed description of the preferred embodiment of the present invention will now be described with reference to FIGS. 1 through 4.

Figure 1:
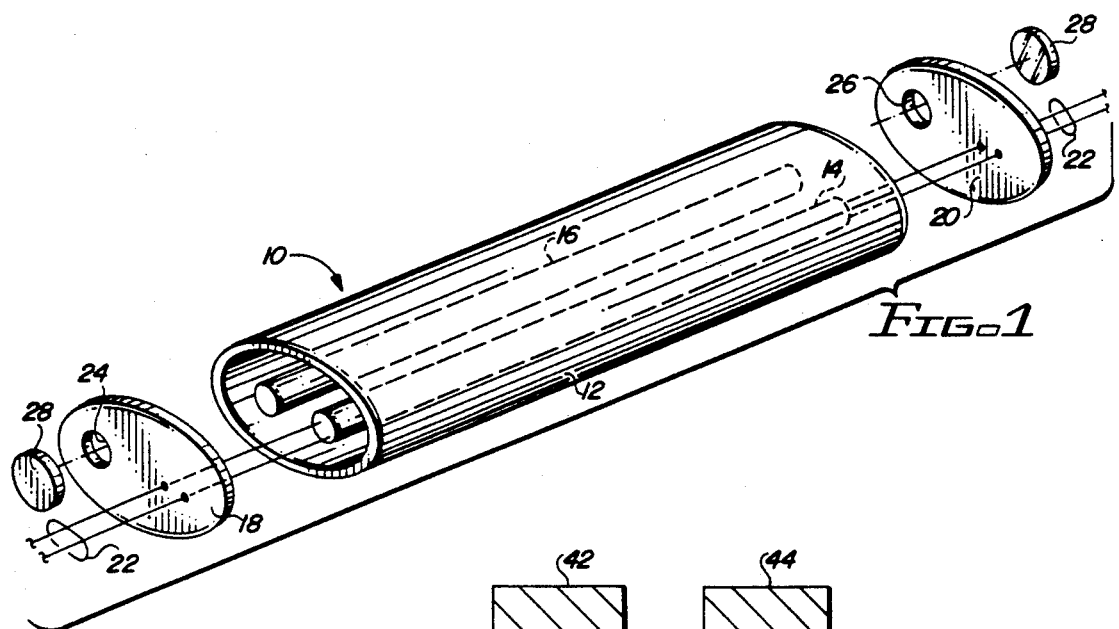
FIG. 1 is a perspective view of the laser including the elliptically-shaped tubular reflector.

Referring to FIG. 1 there is shown a laser 10 that is used as a laser light generating equipment (not shown). The laser 10 has an elliptically-shaped tubular reflector 12 that encloses a high intensity light source 14 and a laser rod 16. Coupled to the ends of tubular reflector 12 are end covers 18 and 20. End covers 18 and 20 hold light source 14 and laser rod 16 in place.

Tubular reflector 12 is typically constructed from a metal, such as 303 stainless steel or 304 stainless steel having a thickness of 0.059 inches. Tubular reflector 12 is preferably elliptically-shaped and open at both ends. The fabrication of this tubular reflector 12 will be explained in more detail in connection with FIG. 2 and FIG. 3. The interior walls of tubular reflector 12 are preferably coated with a highly reflective material. It is preferable that the tubular reflector 12 have an outer dimension of 1.13 inches at the widest part, 0.85 inches at its narrowest point and a length of 3.28 inches.

Light source 14 is powered by a high-voltage power source (not shown) through wires 22 which protrude through end covers 18 and 20. It is preferable that light source 14 be constructed from a clear fused quartz material and contain a high pressure crypton gas such that light source 14 is continuously illuminated when laser 10 is in operation. The dimensions of this light source 14 is preferably less than 8.5 mm in diameter and extends through tubular reflector 12. One such light source 14 is model number NL504 manufactured by Heraeus Noblelight of Cambridge, England.

The laser rod 16 is positioned adjacent to and parallel to light source 14. It is preferable that light source 14 and laser rod 16 be located adjacent the foci of tubular reflector 12. It is recognized that by positioning light source 14 and laser rod 16 adjacent to each other and the foci of tubular reflector 12, maximum efficiency of laser 10 is obtained. The laser rod 16 is preferably of type neodymium YAG crystalline structure. It is preferable that laser rod 16 have a 5 millimeter diameter and a 100 millimeter length. Although a neodymium YAG crystalline rod is specified, any crystalline rod that transforms light energy into a cohesive light beam may be used.

End covers 18 and 20 fit over the ends of tubular reflector 12. Disposed on end covers 20 and 22 is aperture 24 and aperture 26, respectively. End covers 18 and 20 contain fluid within laser 10 cavity and support light source 14 and laser rod 16 in their proper positions.

Disposed over apertures 24 and 26 are reflecting mirrors 28 and 30, respectively. Reflecting mirror 28 reflects back into laser rod 16 any light emitted by laser rod 16 through aperture 24 when light source 14 is energized. Mirror 30 reflects back into laser rod 16 most of the light that is emitted through aperture 26. Mirror 30 has a dielectric material on its surface to allow a portion of the light emitting through aperture 26 to be fed to the next stage in the laser light generator's equipment.

During operation, energy is fed to light source 14 through line 22. Light source 14 is energized in response to electricity being fed on wire 22 by the power source. When light source 14 is energized, light is transferred to laser rod 16, both directly from light source 14, and indirectly by reflecting off tubular reflector 12's inner walls. By known principles, laser rod 16 converts the light transferred by light source 14 to a coherent beam. This beam then radiates through aperture 24 and is reflected back by mirror 28. Further, this beam is emitted through aperture 26 of which a portion is directed through mirror 30 to the other stages in the laser light generating equipment and a portion is reflected back into laser rod 16 by mirror 30.

Figure 2:
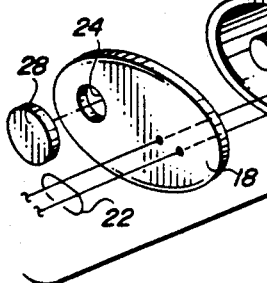
FIG. 2 shows a flow diagram of the stages of fabricating an elliptically-shaped tubular reflector.
Figure 3A:
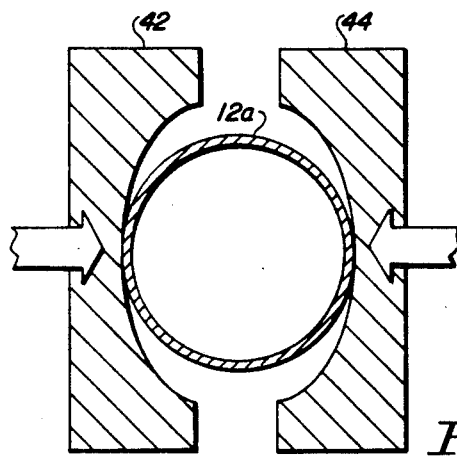
FIG. 3 is a top view of a tubular reflector showing the stages of fabricating an elliptically-shaped tubular reflector.
Figure 3B:
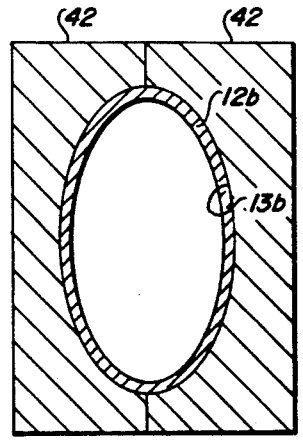

Referring to FIG. 2, there is shown a diagram of the steps for fabricating the tubular reflector 12. The first stage in fabricating the tubular reflector 12 is step 34. In process step 34, a stainless steel tube, preferably having a length of 3.3 inches and a diameter of 1 inch, is smoothed on the surface of its interior walls using a lathe machine. This smoothing process removes all ridges and flaws in the interior walls' surfaces of the round tube. Referring to FIG. 2 and FIG. 3, in step 36, tubular reflector 12a is placed between a dye or mold having two parts 42 and 44. The mold is preferably made from a tooling steel material. Each of the surfaces of molds 42 and 44, respectively, are semi-elliptically shaped.

In step 38 the molds 42 and 44 are pressed toward each other using a pressing machine such as a shop press manufactured by Carolina Tool and Equipment Center of Traveler's Rest, S.C. When molds 42 and 44 are pressed together, tubular reflector 12a is molded into an elliptically-shaped tubular reflector 12b.

Figure 4:
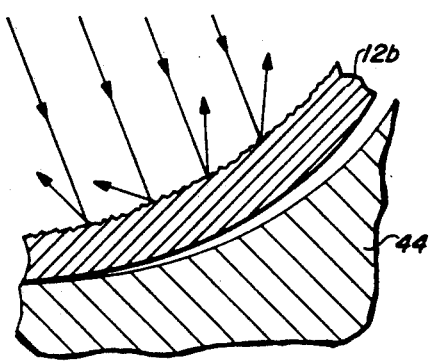
FIG. 4 is a top cutaway view of the tubular reflector showing its inner wall and light reflectors during operation.
Figure 5A:
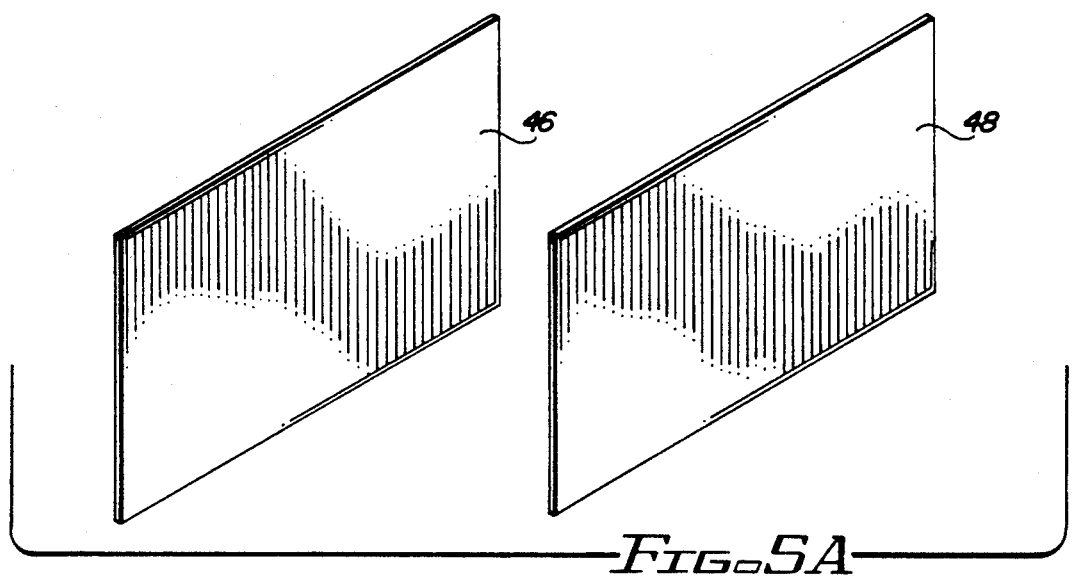
FIG. 5 is a plan view showing the various stages of an alternate method of fabricating an elliptically-shaped tubular reflector.
Figure 5B:
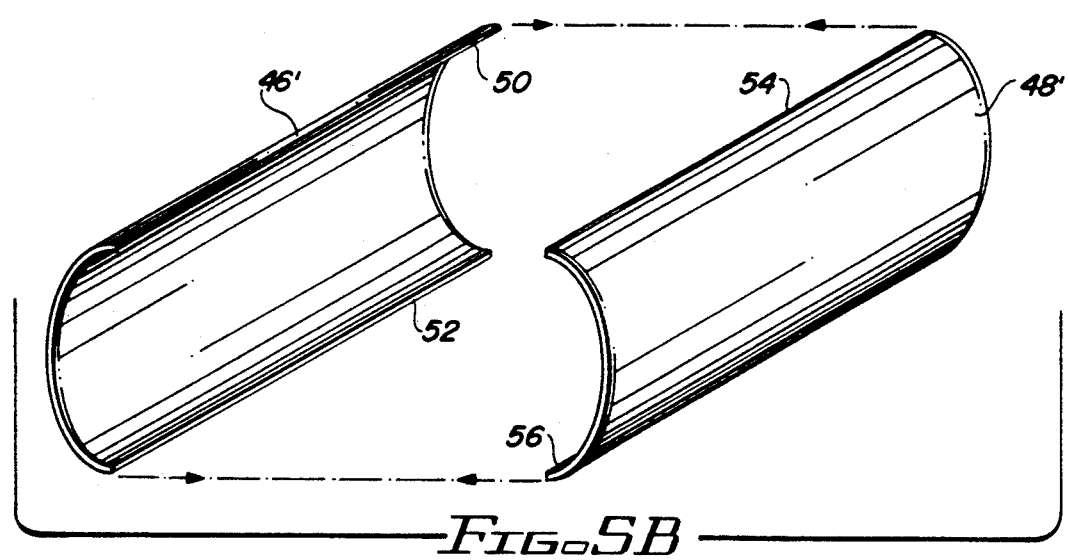
Figure 5C:
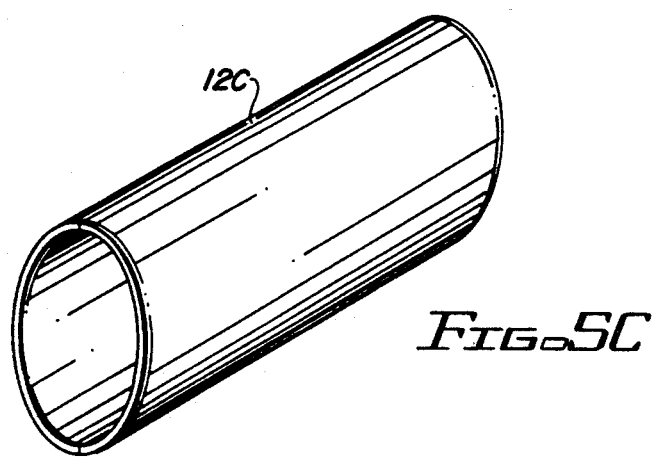

Referring to FIG. 4, after mold 44 changes the shape of tubular reflector 12a, the molded tubular reflector 12b interior walls' surfaces will be slightly crinkled. Crinkled is defined to include a surface having many short bends, turns or ripples. Thus, when light strikes tubular reflector 12b, all light will not be directly reflected to the foci of the ellipse, and a portion of the light will be reflected somewhat at random. It is recognized that the crinkled surface increases the efficiency of the laser 10.

In step 40, tubular reflector 12b is removed from the mold and is coated on the surface of its inner walls with a reflective material such as gold or silver. Techniques for applying the reflective coat onto the inner walls of tubular reflector 12b are known (some examples of techniques include spraying and sputtering).

Once tubular reflector 12b has been coated, light source 14 and laser rod 16 are placed in the cavity of tubular reflector 12b. Next, end covers 20 and 22 are placed over tubular reflector 12b. Then tubular reflector 12b is filled with a liquid coolant such as deoxygenated water. The tubular reflector is sealed and placed in the laser light generating equipment.

Referring to FIG. 4, there is shown an alternate method of fabricating the tubular reflector 12. In this method two 0.020-inch thick 304 stainless steel sheets 46 and 48, having dimensions of 1.36 inches by 3.28 inches and a no. 8 finish, are bent using a shop press to form semi-elliptically-shaped sheets 46a and 46b. The resulting sheets 48a's and 48b's inner surfaces are coated with a reflective material such as gold plating. The sheets 46 and 48 are then joined along their long edges 50, 52, 54 and 56 to form tubular reflector 12c. When they are joined, edges 50 and 52 are connected to edges 54 and 56, respectively. It is preferable that the edges be mechanically joined by known techniques. The tubular reflector 12c is then combined with the other elements, as previously explained in FIG. 1, to form laser 10. It is recognized that when the tubular reflector 12 is fabricated by the method shown in FIG. 4, higher intensity laser light output may be obtained for a given light source than described previously.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method of fabricating a laser, the method comprising the steps of:
   providing a tube having an inner wall,
   substantially removing any ridges and flaws on the inner wall to provide a smooth surface such that light reflects from the smooth surface with improved efficiency;
   externally pressing said tube with a mold to change the shape of said tube to increase efficiency in manufacture of the tubular reflector;
   placing a light source and a laser rod into said tube;
   pumping said rod with said light source to produce a coherent energy output; and
   reflecting a portion of the light generated by said light source off the smooth inner walls of said pressed tube and into said laser rod.

2. The method as recited in claim 1, further comprising the step of crinkling the inner walls of said tube when said tube is pressed.

3. The method as recited in claim 1, wherein said tube is round, and wherein said round tube is pressed to an elliptically-shaped tube.

4. The method as recited in claim 3, wherein said light source and said laser rod are placed adjacent the foci side of said ellipse.

5. The method as recited in claim 1, further comprising the step of removing ridges and flaws on the inner surface of said tube before pressing said tube.

6. The method as recited in claim 5, further comprising the step of coating the inside surface of said tube with gold plating after pressing said tube.

7. A method of fabricating a laser, the method comprising the steps of:
   providing a round metal tube having an inner wall;
   smoothing the surface of the inner wall of said tube to substantially remove any ridges and flaws on the inner wall;
   externally pressing said tube with a mold to form an elliptically-shaped tube that maintains its shape, and when pressed reflects light with improved efficiency; and
   placing a coherent light generator into said elliptically shaped tube.

8. The method as recited in claim 7, further comprising the step of crinkling the inner wall of said tube when said tube is pressed.

9. The method as recited in claim 7, wherein said mold includes a first and second block of material with a surface that is semi-elliptically shaped, and wherein said tube is pressed between said semi-elliptically-shaped surfaces.

10. A laser comprising:
    a tubular reflector formed by externally pressing a tube with a mold into a substantially elliptical shaped tube, said elliptically pressed tube having a cavity and inner wall with a reflective surface wherein the surface of the tube's inner wall is smooth so that light reflects from said surface with improved efficiency;
    means disposed within said cavity for generating high intensity light such that a portion of said high intensity light is reflected from said reflective inner surface; and
    means disposed within said cavity and in optical communication with said generating means for receiving and for transforming said high intensity light and said reflected light into a coherent light beam.

11. The laser as recited in claim 10, wherein said inner surface of said tube is coated with a reflective material.

12. A method of fabricating a laser, the method comprising the steps of:
    providing a first and second flat sheet of malleable material;
    smoothing one of the surfaces of the sheets of malleable material to substantially remove ridges and flaws therefrom;
    bending said first and said second sheet into a semi-elliptical shape to form a first half and second half, respectively, of an elliptical tube such that the pressed sheet's polished surface is crinkled to reflect light within an elliptical tube with increased efficiency;
    joining said first and said second sheets along their edges to form a substantially elliptical tube having an inner wall; and
    orienting within said tube a light source and a material that transforms light from said generator into a coherent beam, such that when said light is generated by said light source, a portion of the light is reflected of the polished surface of said tube and into said light transforming material.

13. A laser comprising:
    a tubular reflector having an inner wall and formed by crushing an elongated tube having a polished inner surface, said tubular refelector's inner surface being crinkled and light reflective to reflect light with increased efficiency;
    means disposed within said cavity for generating high intensity light such that a portion of said light is reflected from said surface of said inner wall; and
    means disposed within said cavity and in optical communications with said generating means for receiving and transforming said high intensity light and said reflected light into a coherent light beam.

* * * * *